(12) United States Patent
Matsumoto et al.

(10) Patent No.: US 8,537,698 B2
(45) Date of Patent: Sep. 17, 2013

(54) COMMUNICATION SYSTEM

(75) Inventors: Tadashi Matsumoto, Osaka (JP);
Makoto Nishikawa, Ikoma (JP)

(73) Assignee: Panasonic Corporation, Kadoma-Shi (JP)

( * ) Notice: Subject to any disclaimer, the term of this patent is extended or adjusted under 35 U.S.C. 154(b) by 417 days.

(21) Appl. No.: 12/735,561

(22) PCT Filed: Jan. 28, 2009

(86) PCT No.: PCT/JP2009/051344
§ 371 (c)(1),
(2), (4) Date: Jul. 27, 2010

(87) PCT Pub. No.: WO2009/096421
PCT Pub. Date: Aug. 6, 2009

(65) Prior Publication Data
US 2012/0099445 A1    Apr. 26, 2012

(30) Foreign Application Priority Data
Jan. 28, 2008    (JP) .................................. 2008-016896

(51) Int. Cl.
*H04J 3/16* (2006.01)
*H04L 12/42* (2006.01)

(52) U.S. Cl.
USPC ............................ 370/252; 370/449; 370/486

(58) Field of Classification Search
None
See application file for complete search history.

(56) References Cited

U.S. PATENT DOCUMENTS

2004/0138786 A1* 7/2004 Blackett et al. ............... 700/295
2007/0016708 A1* 1/2007 Park ............................. 710/110

FOREIGN PATENT DOCUMENTS

| JP | 52-72436 A | 6/1977 |
| JP | 2000-277270 A | 10/2000 |
| JP | 2001-95232 A | 4/2001 |
| JP | 2001-251790 A | 9/2001 |
| JP | 2005-124341 A | 5/2005 |
| JP | 2005-143055 A | 6/2005 |
| JP | 2005259077 A * | 9/2005 |
| JP | 2007-142774 A | 6/2007 |

OTHER PUBLICATIONS

International Search Report dated Apr. 21, 2009, issued in PCT/JP2009/051344.

* cited by examiner

*Primary Examiner* — Chirag Shah
*Assistant Examiner* — Jenkey Van
(74) *Attorney, Agent, or Firm* — Edwards Wildman Palmer LLP; James E. Armstrong, IV; George N. Chaclas

(57) ABSTRACT

A communication system has a communication control unit, communication terminal units and communication units. The communication control unit and the communication terminal units communicate according to a first protocol. The communication units mutually communicate according to a second protocol. A specific communication unit of the communication units has a data analyzer and a data transmitter. The data analyzer judges whether or not second monitoring information represents a steady state. The data transmitter transmits the control information corresponding to the second monitoring information to at least one related second communication terminal unit through the communication control unit according to the first protocol if the second monitoring information represents an unsteady state. Thereby, the load connected to the second communication terminal unit is controlled.

6 Claims, 10 Drawing Sheets

COMMUNICATION SYSTEM

TECHNICAL FIELD

The invention relates generally to communication systems and, more particularly, to a communication system comprising a communication control unit connected to a communication line, communication terminal units which are connected to a communication line and configured to communicate with the communication control unit in accordance with a first protocol, and a communication units which are connected to a communication line and configured to mutually communicate in accordance with a second protocol.

BACKGROUND ART

For example, Japanese Patent No. 1180690 (Japanese Patent Application Publication No. 52-072436) discloses a communication system (a time division multiple access transmission system). In this system, a communication control unit (a primary station) and communication terminal units (secondary stations) are connected to a communication line and communication is performed between the communication control unit and each communication terminal unit. The communication control unit is configured to regularly monitor each state of the communication terminal units and, if a communication terminal unit's state is changed (e.g., a switch included in a communication terminal unit is turned on or off), supply the other communication terminal units with a signal for performing a process corresponding to the state change. In the communication system, the communication is always performed via the communication control unit (A1) as shown in FIG. 1 and there is no chance that the communication terminal units (B1) directly communicate with each other.

Thus, the communication terminal units (B1) communicate with each other always via the communication control unit A1, and accordingly the communication system comes to have a low communication speed and is inept to transmission of information including comparatively a lot of data volume, such as a measurement value of electric energy. The whole system may also stop by failure of the communication control unit (A1) or the like, which causes reliability degradation.

Japanese Patent No. 3498646 (Japanese Patent Application Publication No. 2001-095232A) discloses a communication system. As shown in FIG. 2, this system is configured so that communication units (B2) connected to a communication line (W) directly communicate with each other by peer-to-peer (hereinafter also referred to "P2P"). In this configuration, the communication speed is improved, and accordingly it is possible to transmit information including comparatively a lot of data volume. In FIG. 2, A2 is a power feeding device that supplies electric power with each of the communication units (B2) via the communication line (W).

In these systems, the former is in widespread use compared with the latter, while the latter runs ahead of the former in point of a communication speed and reliability. Therefore, Japanese Patent Application Publication No. 8-274724 discloses a communication system including both the systems as shown in FIG. 3. In FIG. 3, each communication terminal unit (B1) generates control information in response to first monitoring information (e.g., switch on or off) to transmit the control information to one or other communication terminal units (B1) via the communication control unit (A1), thereby controlling the one or other communication terminal units' (B1) loads. Each communication unit (B2) receives second monitoring information (e.g., a measurement value of electric power consumption) and then directly transmits the second monitoring information to other communication units (B2) by P2P. Thus, in the communication system, the communication terminal units (B1) and the communication units (B2) operate independently, and the communication terminal units (B1) are used for load control, while the communication units (B2) are used for measurement or the like.

In the communication system of FIG. 3, when the second monitoring information, for example, a measurement value of electric power consumption of a load excessively increases, it is desirable that the electric power consumption of the load is reduced for power saving. However, in the communication system, the communication terminal units (B1) and the communication units (B2) are connected to the same communication line (W) but cannot communicate with each other, and accordingly cannot control each load of the communication terminal units (B1) based on the second monitoring information.

DISCLOSURE OF THE INVENTION

It is an object of the present invention to control a load installed in a communication terminal unit based on second monitoring information obtained by a communication unit.

A communication system of the present invention comprises (a communication control unit,) communication terminal units and communication units which are connected to a communication line. The communication terminal units are configured to communicate (with the communication control unit) in accordance with a first protocol. The communication units are configured to mutually communicate in accordance with a second protocol. The communication terminal units comprise at least one first communication terminal unit and at least one second communication terminal unit which are related previously. The first communication terminal unit transmits control information corresponding to first monitoring information to at least one related second communication terminal unit (through the communication control unit), thereby controlling a load connected to the second communication terminal unit. The communication units comprise at least one first communication unit and at least one second communication unit which are related previously. If obtaining second monitoring information, the first communication unit transmits the second monitoring information to a related second communication unit. A specific communication unit of the communication units comprises a data analyzer and a data transmitter. The data analyzer is configured to judge whether or not obtained second monitoring information represents a steady state. The data transmitter is configured, if the second monitoring information represents an unsteady state, to transmit control information corresponding to the second monitoring information to at least one related second communication terminal unit (through the communication control unit) in accordance with the first protocol and thereby to control the load connected to the second communication terminal unit.

In this configuration (hereinafter referred to as a "first configuration"), if second monitoring information represents an unsteady state, control signal is produced in response to the second monitoring information and transmitted to a related second communication terminal unit (through the communication control unit) in accordance with the first protocol. Thereby, a load connected to the second communication terminal unit can be controlled. That is, it is possible to control a load connected to a communication terminal unit based on second monitoring information obtained through a communication unit.

In an embodiment, said first communication unit is said specific communication unit and connected with a monitored device configured to produce said second monitoring information. The data analyzer of said first communication unit is configured to periodically obtain second monitoring information by periodically communicating with the monitored device connected to the first communication unit. Said second communication unit is connected with a monitoring device configured to obtain second information from at least one related first communication unit.

In this configuration (hereinafter referred to as a "second configuration"), the data analyzer can periodically obtain second monitoring information. Accordingly, when second monitoring information represents an unsteady state, control information can be quickly transferred to a related second communication terminal unit.

In the first configuration, preferably, said first communication unit is said specific communication unit and connected with a monitored device configured to produce said second monitoring information. Preferably, said second communication unit is connected with a monitoring device configured to obtain second information from at least one related first communication unit. Preferably, the data analyzer of said first communication unit is configured, when the monitored device connected to the first communication unit communicates with a monitoring device connected to a related second communication unit, to obtain second monitoring information transmitted from the monitored device to the monitoring device.

In this configuration (hereinafter referred to as a "third configuration"), when the monitoring device communicates with the monitored device, the data analyzer obtains second monitoring information transmitted from the monitored device to the monitoring device. Accordingly, the data analyzer can obtain second monitoring information without increasing communication traffic.

In the third configuration, preferably, the monitoring device connected to said second communication unit is configured to perform periodic polling with respect to at least one related first communication unit in accordance with the second protocol through the second communication unit and to periodically obtain second monitoring information returned from the first communication unit in response to the periodic polling through the second communication unit. Preferably, said first communication unit further comprises a polling cycle acquisition part configured to obtain a cycle of the periodic polling. Preferably, the data transmitter of said first communication unit is configured, if judgment result of an unsteady state is obtained from the data analyzer of the first communication unit, to transmit said control information to at least one related second communication terminal unit through the communication control unit except the timing of the cycle of the periodic polling.

In this configuration, since the data transmitter transmits control information to the second communication terminal except the timing of the periodic polling, it is possible to avoid conflict between data transmitted by the first protocol and data transmitted by the second protocol.

In the third configuration, preferably, the polling cycle acquisition part of said first communication unit is configured to obtain return time which it takes for the first communication unit to return second monitoring information to said second communication unit in response to polling from the second communication unit. Preferably, the data transmitter of said first communication unit is configured to transmit said control information to at least one related second communication terminal unit except the timing of the cycle of the periodic polling and the return time.

In this configuration, control information is transmitted except the return time from a monitored device with respect to polling. Accordingly, even if the polling cycle is short and a ratio of the return time to one cycle is comparatively large, it is possible to avoid conflict between data transmitted by the first protocol and data transmitted by the second protocol.

In first to third configurations, preferably, said data transmitter comprises a first protocol signal transmitter, a second protocol signal transmitter and a switch part. Preferably, the first protocol signal transmitter is configured to transmit data in accordance with the first protocol, and the second protocol signal transmitter is configured to transmit data in accordance with the second protocol. Preferably, the switch part is configured to alternatively connect said first or second protocol signal transmitter to the communication line.

In this configuration, it is possible to enhance impedance of a communication unit seen from the communication line in comparison with the connection of both of the first protocol signal transmitter and the second protocol signal transmitter to the communication line.

In the first to third configurations, preferably, said first communication unit further comprises a storage device which stores control information corresponding to the second monitoring information. Preferably, the data analyzer of said first communication unit is connected with the monitored device of the first communication unit side. Preferably, the data analyzer of said first communication unit is configured to read control information, corresponding to second monitoring information from the monitored device, from the storage device to transmit the control information to at least one related second communication terminal unit.

In this configuration, the first communication unit can transmit control information corresponding to second monitoring information from the monitored device to at least one related second communication terminal unit and can control the load by the control information corresponding to the second monitoring information.

In the first to third configurations, preferably, said specific communication unit further comprises a threshold setting part that is configured to set a criterion threshold by which said data analyzer judges whether or not said second monitoring information represents a steady state.

In this configuration, the criterion threshold for judging whether or not second monitoring information represents a steady state can be set through the threshold setting part. Accordingly, it is possible to change the criterion for judging whether to transmit control information to a communication terminal unit or not.

In this configuration, only second communication unit connected with said monitoring device may be provided with said data analyzer.

In this configuration, installation cost of the communication system can be reduced in comparison with the construction that every communication unit is provided with said data analyzer.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

First Embodiment

Figure 4:
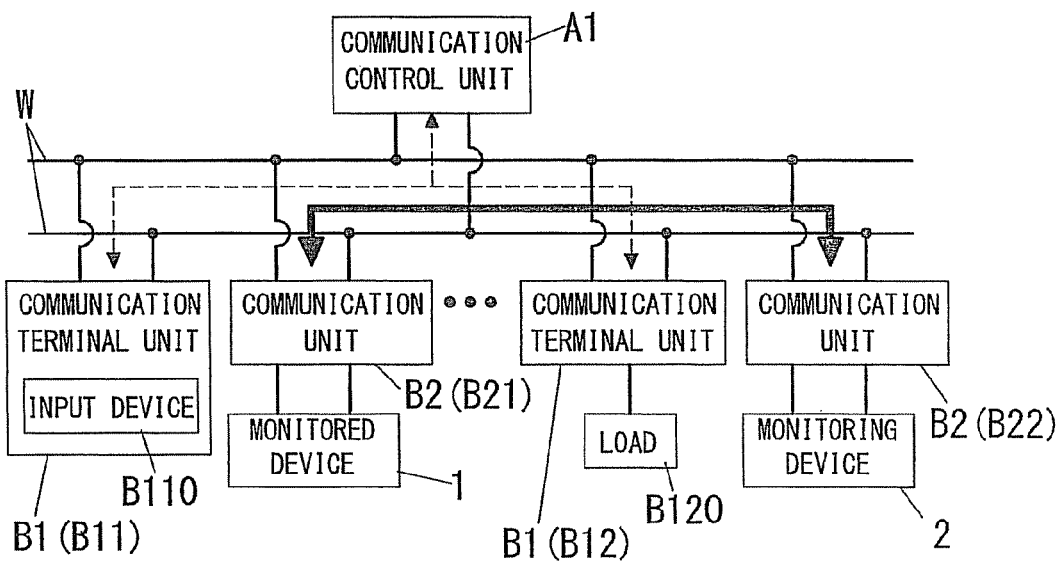
FIG. 4 is a schematic diagram of a communication system in accordance with a first embodiment of the present invention.

FIG. 4 shows a communication system in accordance with a first embodiment of the present invention. The communication system includes a communication control unit (A1), a plurality of (in FIG. 4, two or more) communication terminal units (B1) and a plurality of (in FIG. 4, two or more) communication units (B2) that are connected to a communication line (W). In the embodiment, the communication control unit (A1) is a primary station. Each of the communication terminal units (B1) is a secondary station and configured to communicate with the communication control unit A1. The communication units (B2) are each a peer-to-peer device and configured to directly communicate with each other. However, not limited to the example of FIG. 4, a communication terminal unit and a communication unit in the present invention may be unified, or a communication terminal unit, a communication unit and a load in the present invention may be unified.

The communication terminal units (B1) are connected in parallel with the communication control unit (A1) through a two-wire communication line (W). Each communication terminal unit (B1) is previously related to one or more other communication terminal units (B1) through the communication control unit (A1). The communication control unit (A1) and the communication terminal units (B1) constitute a time division multiple access transmission system (hereinafter referred to as a "basic system") in which data transmission from the unit (A1) to units (B1) and data transmission from the units (B1) to unit (A1) are performed by time division.

In the basic system, each communication terminal unit (B1) is classified into any of different first and second communication terminal units. The first communication terminal unit is, for example, a monitoring terminal (B11) including an input device (B110) such as a switch, a sensor or the like. The second communication terminal unit is, for example, a control terminal (B12) connected to a load (B120). Thereby, it is possible to control a load (B120) connected to a control terminal (B12) in response to first monitoring information from the input device (B110) included in a monitoring terminal (B11). However, the communication terminal units configured to communicate in accordance with a first protocol in the present invention may be, but not limited to communication terminal units in a polling/selecting communication system, for example, peer-to-peer devices configured to communicate in accordance with a P2P protocol, respectively.

Each communication terminal unit (B1) is provided with an address (identifier). Each monitoring terminal (B11) is configured to receive first monitoring information through its own input device (B110) and then to transmit control information corresponding to the first monitoring information to the communication control unit (A1). The communication control unit (A1) is configured to receive the control information and then to transmit the control information to the control terminal (B12) related to the monitoring terminal (B11) by address. Each control terminal (B12) is configured to receive control information and then to control its own load (B120) in accordance with the control information. The communication control unit (A1) intervenes between each monitoring terminal (B11) and each control terminal (B12). Since the control information for controlling a load (B12) reflects the first monitoring information, the control information is transmitted through the communication line and thereby the first monitoring information is reflected in load control.

Figure 5:
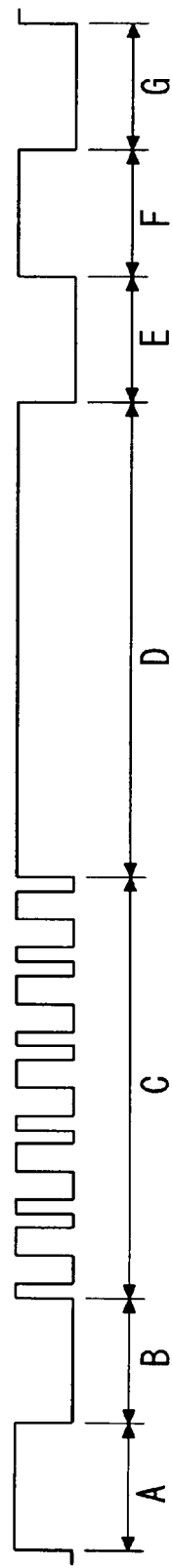
FIG. 5 is an explanatory diagram of format of a transmission signal used for the communication system.

The operation of the basic system is explained. The communication control unit (A1) is configured to transmit data by pulse-width modulating a carrier formed of a pulse train, and sends out a transmission signal having the format as shown in FIG. 5 to the communication line (W). The transmission signal is a bipolar (+/−24V) time-division multiplex signal. The transmission signal is formed of an interruption pulse period (A) for detecting an interruption signal, a preparatory period (B) which is set according to an interruption pulse period (E) and a shunt detection period (F) to be described, a signal transmission period (C) for transmitting data to a communication terminal unit (B1), a signal return period (D) which is a time slot for receiving a return signal from a communication terminal unit (B1), the interruption pulse period (E) for detecting an interruption signal, the shunt detection period (F) for detecting a circulatory shunt, and a preparatory domain period (G) used when processing is not in time.

Each control terminal (B12) obtains, when its own address agrees with the address data included in the signal transmission period (C) of a transmission signal received through the communication line (W), control information for controlling its own load (B120) from the transmission signal, and returns control information in synchronization with the signal return period (D) of the transmission signal by a current mode signal (a signal sent out by short-circuiting the communication line (W) through an appropriate low impedance). Electric power for internal circuits in each communication terminal unit (B1) is obtained by rectifying and stabilizing a transmission signal transmitted through the communication line (W).

The communication control unit (A1) performs always-polling for always changing address data included in a transmission signal in a cycle and then sequentially accessing each communication terminal unit (B1). In the always-polling, a communication terminal unit (B1) of which address agrees with the address data included in a transmission signal obtains control information if it is included in the transmission signal, and then operates. The communication terminal unit (B1) then returns the operation state to the communication control unit (A1).

When receiving an interruption signal generated according to first monitoring information from any monitoring terminal (B11), the communication control unit (A1) searches the monitoring terminal (B11) generating the interruption signal. The unit (A1) then access the monitoring terminal (B11) to perform interruption polling for making it return control information in concert with the first monitoring information as well.

That is, the communication control unit (A1) performs always-polling for always sending out a transmission signal, obtained by periodically changing address data, to the communication line (W). When detecting an interruption signal from a monitoring terminal (B11) in synchronization with the interruption pulse period (A) or the interruption pulse period (E) of a transmission signal, the unit (A1) sends out a transmission signal of which mode data is set to an interruption polling mode. The monitoring terminal (B11) generating the interruption signal returns, if the higher bits of its own address agrees with the higher bits of the address data in the transmission signal of the interruption polling mode, the lower bits of its own address as return data in synchronization with the signal return period (D) of the transmission signal. Thereby, the communication control unit (A1) can obtain the address of the monitoring terminal (B11) generating the interruption signal.

If the communication control unit (A1) obtains the address of the monitoring terminal (B11) generating the interruption signal, the unit (A1) sends out a transmission signal for requesting return of control information to the monitoring terminal (B11). The monitoring terminal (B11) returns control information corresponding to first monitoring information to the communication control unit (A1). The communication control unit (A1) receives the control information and then provides the monitoring terminal (B11) with an instruction to rid the first monitoring information. The monitoring terminal (B11) returns ridding of the monitoring information.

The communication control unit (A1) receiving the control information produces control information to be transmitted to the control terminal (B12) related with the monitoring terminal (B11) that is the source of the control information by address correspondence relation. The communication control unit (A1) then sends out a transmission signal including the control information to the communication line (W) to control the load (B120) connected to the control terminal (B12).

Thus, in the basic system, the communication terminal units (B1) communicate with each other through the communication control unit (A1) in accordance with a polling/selecting protocol (hereinafter referred to as a "first protocol").

In the embodiment, communication units (B2) are connected in parallel with each other through the communication line (W) so as to share the basic system and the communication line (W). Each communication unit (B2) is previously related to one or more other communication units (B2). That is, each communication unit (B2) includes a storage device that previously stores address of one or more other communication units (B2). Each communication unit (B2) is also classified into any of different first and second communication units. The first communication unit (B21) is connected with a monitored device (1) for obtaining second information transmitted between communication units (B2). The second communication unit (B22) is connected with a monitoring device (2) for obtaining second monitoring information from a first communication unit(s) (B21). That is, each communication unit (B2) performs communication (data transmission) through the communication line (W), but a monitored device (1) produces and transmits its data (second monitoring information), while a monitoring device (2) receives and processes the data. Accordingly, each communication unit (B2) added to the basic system functions as an adapter and communicates by converting data from a monitored device (1) or a monitoring device (2) to send out to communication line (W).

Figure 6:
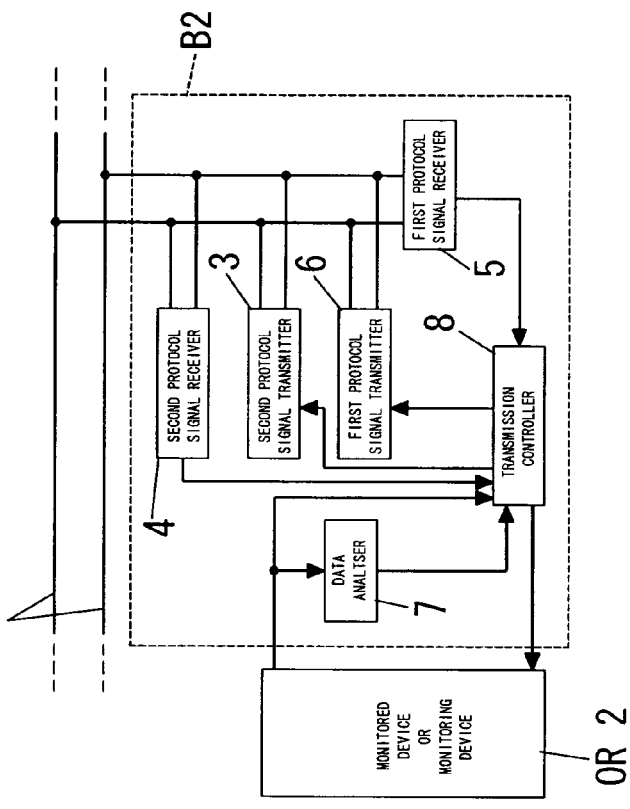
FIG. 6 is a schematic diagram of each communication unit in the communication system.

The system comprising the communication units (B2) is configured so that each communication unit (B2) transmits data (e.g., second monitoring information) without control of the communication control unit (A1) in accordance with the P2P protocol (herein after referred to as a "second protocol") different from the first protocol. Specifically, as shown in FIG. 6, each communication unit (B2) includes a second protocol signal transmitter (3) and a second protocol signal receiver (4). The second protocol signal transmitter (3) is configured, in accordance with the second protocol, to superimpose a packet including data to be transmitted to other communication unit (B2) on a transmission signal to send out the transmission signal to the communication line (W). The second protocol signal receiver (4) is configured to receive a packet transmitted in accordance with the second protocol from the other communication unit (B2). That is, the first protocol based communication is performed among the communication terminal units (B1) via the communication control unit (A1), whereas the second protocol based communication is directly performed among the communication units (B2), and does not depend on the communication control unit (A1). Accordingly, each communication unit (B2) does not directly communicate with each communication terminal unit (B1).

Each communication unit (B2) further includes a first protocol signal receiver (5), a first protocol signal transmitter (6), a data analyzer (7) and a transmission controller (8). The first protocol signal receiver (5) is configured to receive a transmission signal transmitted between the communication control unit (A1) and each communication terminal unit (B1) in the basic system in accordance with the first protocol. The first protocol signal transmitter (6) is configured to transmit data to the communication control unit (A1) in accordance with the first protocol. The data analyzer (7) is configured to analyze the second monitoring information obtained from a monitored device (1) to judge whether or not the second monitoring information represents a steady state. The transmission controller (8) is configured to send out data from either the first protocol signal transmitter (6) or the second protocol signal transmitter (3) based on the judgment result of the data analyzer (7).

The transmission controller (8), the first protocol signal transmitter (6) and the second protocol signal transmitter (3) constitute a data transmitter. If the second monitoring information represents a steady state, the data transmitter transmits second monitoring information from the second protocol signal transmitter (3) to other communication unit (B2) in accordance with the second protocol. If the second monitoring information represents an unsteady state, the data transmitter transmits control information corresponding to the second monitoring information from the first protocol signal transmitter (6) to the communication control unit (A1) in accordance with the first protocol. The second protocol signal transmitter (3) changes waveform or frequency of transmit data (e.g., second monitoring information) in accordance with the second protocol, but maintains and transmits contents of the second monitoring information obtained from the monitored device (1). The first protocol signal transmitter (6) produces control information based on the second monitoring information obtained from the monitored device (1) and transmits the control information to the communication control unit (A1). The communication control unit (A1) transmits the control information to the second communication terminal unit previously related to the data transmitter. Thereby, it is possible to control the load connected to the second communication terminal unit.

In the embodiment, the transmission controller (8) analyzes data transmission state (hereinafter referred to as a "state") according to the first protocol from a transmission signal received through the first protocol signal receiver (5), and judges whether or not the state is suitable for packet transmission according to the second protocol. The transmission controller (8) also transmits the packet from the second protocol signal transmitter (3) at the timing judged to be suitable for the transmission.

The first protocol is used by the basic system and each first protocol signal transmitter (6), and a transmission signal obtained by pulse-width modulating a carrier formed of a pulse train is transmitted. A packet according to the second protocol is superimposed on a transmission signal according to the first protocol. In this instance, it is preferable that a packet is superimposed on a transmission signal in a period of time that the transmission signal is stable at a high level or a low level.

In the format of the transmission signal in FIG. 5, the preparatory period (B), the shunt detection period (F) and the preparatory domain period (G) are a relatively long period in which a transmission signal is stable at a high level or a low level, and accordingly considered as a period of time (hereinafter referred to as an "adequate communication period") that is suitable for transmitting a packet. Other periods include a relatively short time in which a transmission signal is stable at a high level or a low level and susceptible to the signal transmission between the communication control unit (A1) and each communication terminal unit (B1) according to the first protocol (an interruption signal or return data), which are considered as a period of time (hereinafter referred to as an "inadequate communication period") that is unsuitable for transmitting a packet. In addition, a rise time and a fall time in a transmission signal are susceptible to superimposed harmonic noise and accordingly can be regarded as an inadequate communication period.

In the embodiment, the transmission controller (8) is configured to analyze the state of a transmission signal (interruption pulse period, preparatory period, signal transmission period, signal return period, interruption pulse period, shunt detection period and preparatory domain period) received through the first protocol signal receiver (5). The controller (8) is configured to judge whether the present period of time is the adequate communication period or the inadequate communication period based on the analyzed result (the state of a transmission signal). The controller (8) is configured to transmit a packet from the second protocol signal transmitter (3) in accordance with the second protocol as long as it is judged to be the adequate communication period. Thereby, it is possible to avoid the interference between the first protocol based communication and the second protocol based communication which use the common communication line (W). However, unless interference occurs between the first protocol and the second protocol, the second protocol based communication may be performed irrespective of timing of the first protocol based communication.

In the embodiment, the power supply to different parts of each communication unit (B2) is a system (a concentrated feeding system) configured to feed by rectifying and stabilizing a transmission signal transmitted through the communication line (W) from the communication control unit A1 like each communication terminal unit (B1) in the basic system. However, the power supply may be a system (a local feeding system) configured to feed by rectifying and stabilizing commercial power.

Figure 7:
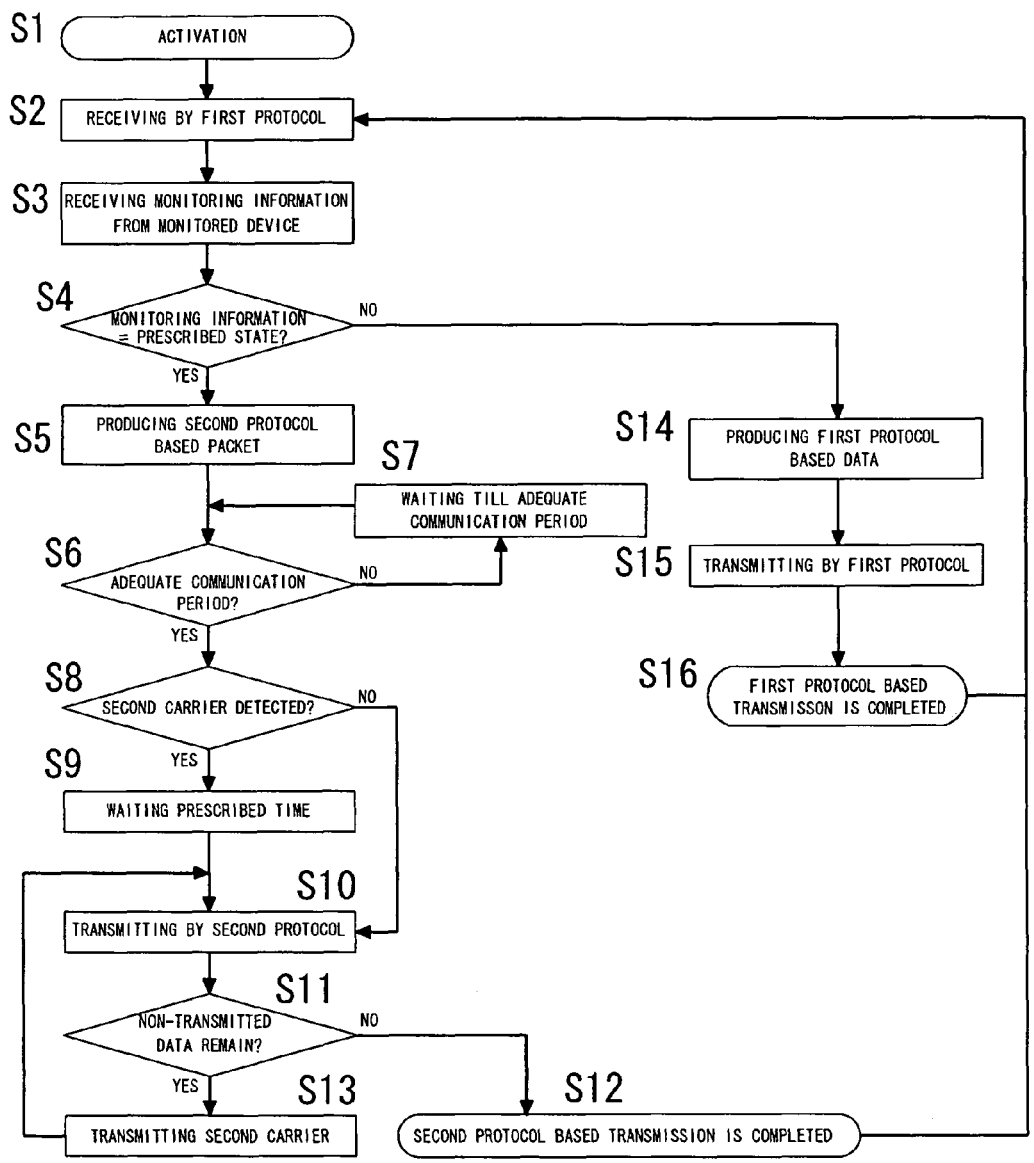
FIG. 7 is a flow diagram showing each operation of the communication units in the communication system.

The operation of each communication unit (B2) is now explained with reference to the flow diagram of FIG. 7. Each communication unit (B2) is activated (S1), and then receives a transmission signal from its own communication control unit (A1) in accordance with the first protocol (S2) and produces electric power by rectifying and stabilizing the transmission signal. In the embodiment, data are transmitted in accordance with the second protocol during the adequate communication period. Accordingly, each transmission controller (8) receives a transmission signal that is used for judgment of the adequate communication period.

A first communication unit (B21) periodically communicates with the monitored device (1) and then periodically extracts second monitoring information from the monitored device (1) (S3). The first communication unit (B21) then judges whether or not the second monitoring information represents a steady state (S4).

If the second monitoring information represents a steady state, the first communication unit (B21) produces a packet including the second monitoring information in accordance with the second protocol (S5). The transmission controller (8) of the first communication unit (B21) analyzes a transmission signal and judges whether the present period of time is the adequate communication period or the inadequate communication period based on the analyzed result (S6). If it is the inadequate communication period, the transmission controller (8) waits until the present period of time becomes the adequate communication period (S7). If it is the adequate communication period, the transmission controller (8) controls so that a carrier (hereinafter referred to as a "second carrier") used for packet transmission according to the second protocol is detected through the second protocol signal receiver (4) (S8). If the second carrier is detected through the second protocol signal receiver (4), the transmission controller (8) waits for a prescribed time (S9) and transmits the packet to the communication line (W) through the second protocol signal transmitter (3) in accordance with the second protocol (S10). There is high possibility that harmonic noise is superimposed immediately after a state of a transmission signal changes (rise and fall of a transmission signal). Accordingly, even if the second carrier is not detected, the packet is transmitted after adequate time in which harmonic noise is attenuated.

If transmission data have large data volume, the transmission data may not be transmitted within one adequate communication period. Accordingly, the transmission controller (8) judges whether or not non-transmitted data remain (S11). Unless non-transmitted data remain, the packet transmission according to the second protocol is completed (S12) and step S2 is returned to. If non-transmitted data remain, the remaining data will be transmitted within the next adequate communication period. If a packet is transmitted from other communication unit (B2) in accordance with the second protocol during the next adequate communication period, there is a possibility that a communication error occurs by collision of both packets.

Therefore, if non-transmitted data remain, the transmission controller (8) first transmits a second carrier to the communication line (W) through the second protocol signal transmitter (3) during the aforesaid next adequate communication period (S13). The transmission controller (8) then transmits a packet including the non-transmitted data to the communication line (W) through the second protocol signal transmitter (3) (S10). Thus, if the second carrier is transmitted to the communication line (W) before the non-transmitted data are transmitted, the other communication unit (B2) that is about to start packet transmission detects the second carrier and then stops transmitting a packet. Accordingly, the packet can be transmitted without destruction by conflict.

At step S4, if it is judged that the second monitoring information represents an unsteady state, the transmission controller (8) of the first communication unit (B21) produces data (control information) to be transmitted by the first protocol in response to the aforementioned second monitoring information (S14). The transmission controller (8) then transmits the control information to the communication control unit (A1) through the first protocol signal transmitter (6) (S15). At this moment, the first communication unit (21) generates an interruption signal like each monitoring terminal (B11) in the basic system. The first communication unit (21) then returns control information by a signal of an electric current mode in synchronization with the signal return period (D) in a transmission signal received from the communication control unit (A1) through the first protocol signal receiver (5). If transmission of the control information according to the first protocol is completed (S16), step S2 is returned to.

If receiving control information from a communication unit (in the embodiment, the first communication unit (B21)) in accordance with the first protocol, the communication control unit (A1) controls the load connected to the control terminal (B12) related to the communication unit according to the contents of the control information. That is, in the communication control unit (A1), the first communication unit (B21) connected to the monitored device (1) is previously related to the address (identifier) of the communication terminal unit (in the embodiment, control terminal (B12)). Accordingly, the communication control unit (A1) receives control information from a communication unit (first communication unit (B21)) and then transmits the control information to the communication terminal unit (control terminal (B12)) related to the communication unit.

In short, if the second monitoring information obtained from the monitored device (1) represents an unsteady state, the first communication unit (B21) transmits the control information corresponding to the second monitoring information to the related control terminal (B12) through the communication control unit (A1) in accordance with the first protocol. Thereby, it is possible to control the load (B120) connected to the control terminal (B12). As a result, if second monitoring information transmitted and received among communication units (B2) represents an unsteady state, in cooperation with that it is possible to control the load (B120) connected to a control terminal (B12).

A concrete example of the communication system in the embodiment is explained. An input device (B110) of each monitoring terminal (B11) is a switch for producing first monitoring information (an on or off contact signal). A load (B120) connected to each control terminal (B12) is a lighting fixture. Accordingly, the basic system is configured to energize or unenergize the lighting fixtures in response to on or off of the switches. A monitored device (1) connected to each first communication unit (B21) is an electric power measuring device for measuring power consumption of the lighting fixture under the control terminal (B12) related to the first communication unit (B21) itself. A monitoring device (2) connected to each second communication unit (B22) is an inspection meter for displaying the power consumption measured through the electric power measuring device in at least one first communication unit (B21) related to the second communication unit (B22) itself.

When the lighting fixtures are lit normally, each power consumption measured with the electric power measuring devices is in a normal range. Accordingly, each second monitoring information (a measured value of power consumption) obtained in the first communication units (B21) is judged be a steady state. That is, each first communication unit (B21) is previously provided with a threshold which is the upper limit in the normal range of power consumption and is a criterion by which its own data analyzer (7) judges whether or not second monitoring information represents a steady state. That is, if the second monitoring information, namely power consumption is equal to or less than the threshold, the data analyzer (7) judges that the second monitoring information represents a steady state.

Figure 1:
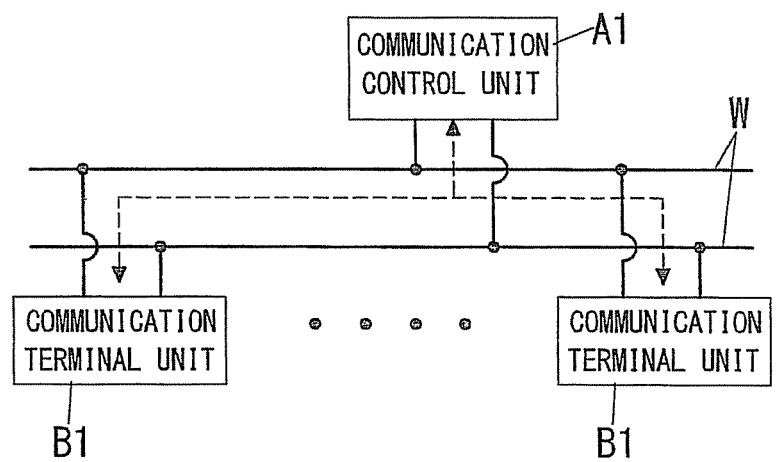
FIG. 1 is a schematic diagram of a prior art—a communication system (a time division multiple access transmission system)
Figure 2:
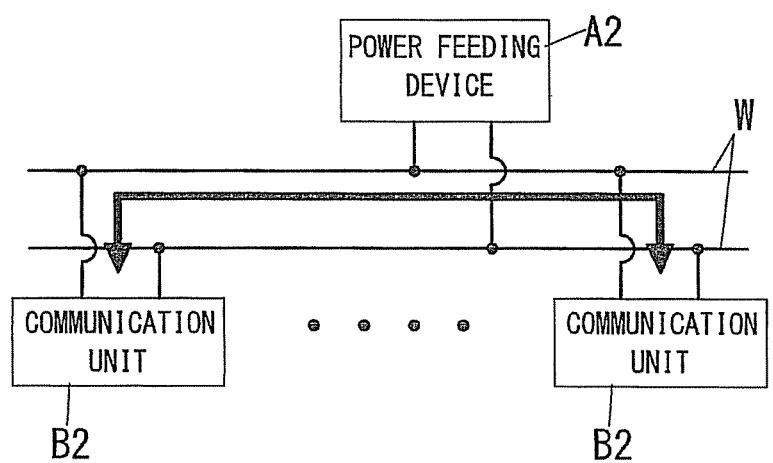
FIG. 2 is a schematic diagram of a prior art—a communication system.
Figure 3:
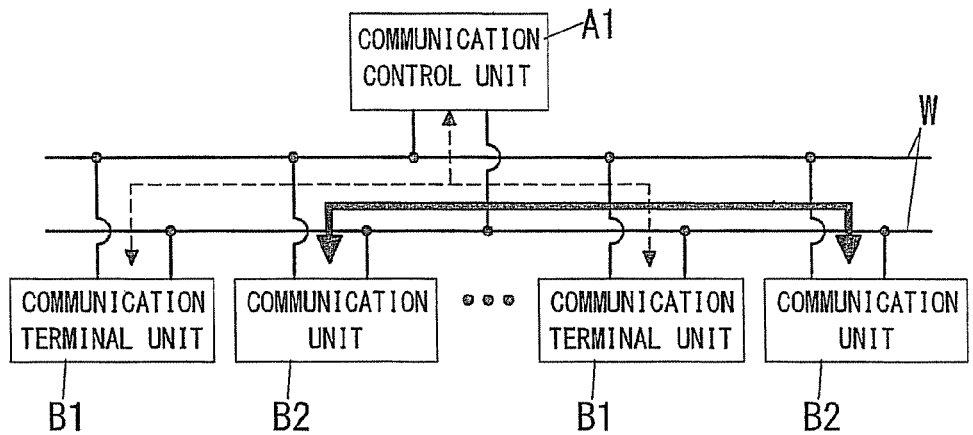
FIG. 3 is a schematic diagram of a prior art—a communication system including both the systems.

If the power consumption measured with an electric power measuring device exceeds the threshold by failure of a lighting fixture or the like, the data analyzer (7) of the first communication unit (B21) connected to the electric power measuring device judges that second monitoring information represents an unsteady state. Incidentally, in the prior art of FIG. 3, if second monitoring information of a communication unit (B2) represents an unsteady state, a user needs to check the display of an inspection meter in order to recognize failure and to turn the lighting fixture off through the switch. As a result, there is a possibility that the unsteady state lasts for a long time. In the embodiment, if detecting an unsteady state from second monitoring information, each first communication unit (B21) transmits control information to the control terminal (12) related to itself through the communication control unit (A1). Thereby, the lighting fixture connected to the control terminal (12) can be turned off. Accordingly, the unsteady state can be prevented from lasting for a long time, and power supply to the lighting fixture can be stopped promptly.

In an embodiment, when second monitoring information (e.g., a measured value of power consumption) represents an excessive rise, each first communication unit (B21) transmits control information, for reducing power consumption of a lighting fixture to perform dimming control for power saving, to the control terminal (B12) related to itself through the communication control unit (A1).

Figure 8:
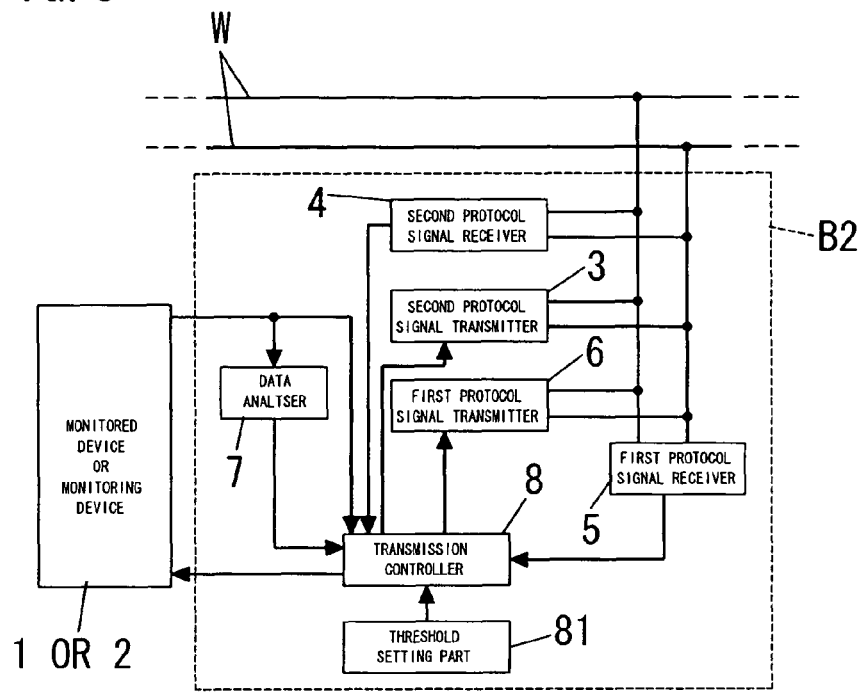
FIG. 8 is a schematic diagram of each communication unit of a communication system in an embodiment.

In an embodiment, as shown in FIG. 8, a communication unit (e.g., a first communication unit (B21)) further includes a threshold setting part (81) configured to set a criterion threshold by which the data analyzer (7) judges whether or not second monitoring information represents a steady state. In this embodiment, a threshold can be set to an arbitrary value.

In an embodiment, the data analyzer (7) of a communication unit (e.g., a second communication unit (B22)) obtains the second monitoring information generated at the monitoring device (2) (e.g., an operation state of the monitoring device (2)) and transmits control information to at least one communication terminal unit (e.g., control terminal (B12)) related to itself when the second monitoring information represents an unsteady state. For example, it is possible to notify failure or the like obtained from the monitoring device (2) through the load (B120) connected to the control terminal (B12).

Figure 9:
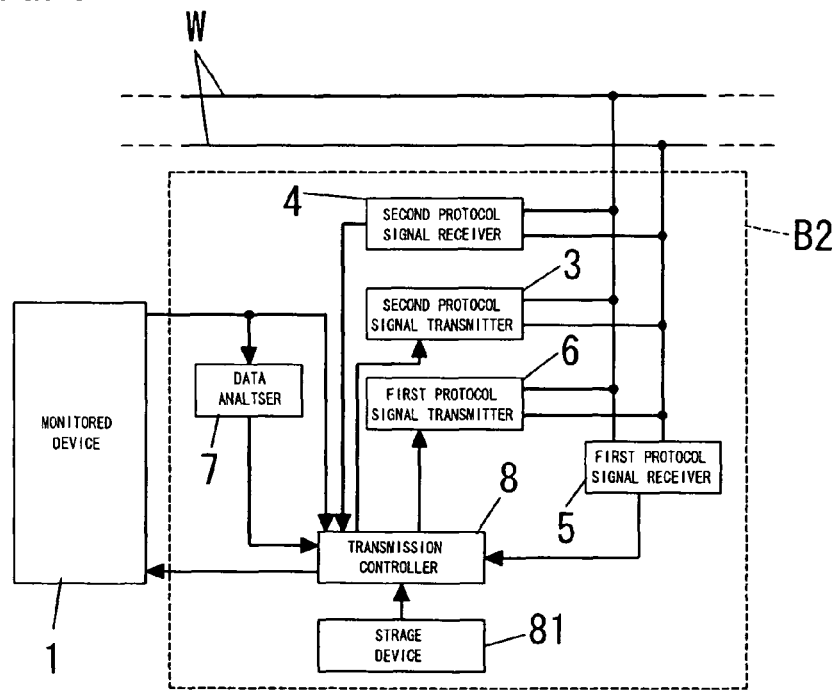
FIG. 9 is a schematic diagram of each communication unit of a communication system in an embodiment.

In an embodiment, as shown in FIG. 9, a first communication unit (B21) connected to each monitored device (1) further includes a storage device (82) configured to store control information corresponding to second monitoring information from the monitored device (1) itself. The transmission controller (8) of the first communication unit (B21) is configured to read control information, corresponding to the second monitoring information from the monitored device (1), from the storage device (82) to transmit the control information to at least one related control terminal (B12). Thereby, the load (B120) connected to the control terminal (B12) can be controlled by the control information corresponding to the second monitoring information. For example, when the load (B120) is a lighting fixture, if power consumption exceeds the threshold, the lighting fixture can be turned off or dimmed in response to the power consumption. On the other hands, the communication control unit (A1) is configured to transmit the control information to at least one related control terminal (B12). In this embodiment, if the second monitoring information from the monitored device (1) represents an unsteady state, the first communication unit (B21) transmits the control information corresponding to the unsteady state to the control terminal (B12). Thereby, the load (B120) connected to the control terminal (B12) can be controlled by the control information corresponding to the second monitoring information.

Second Embodiment

Figure 10:
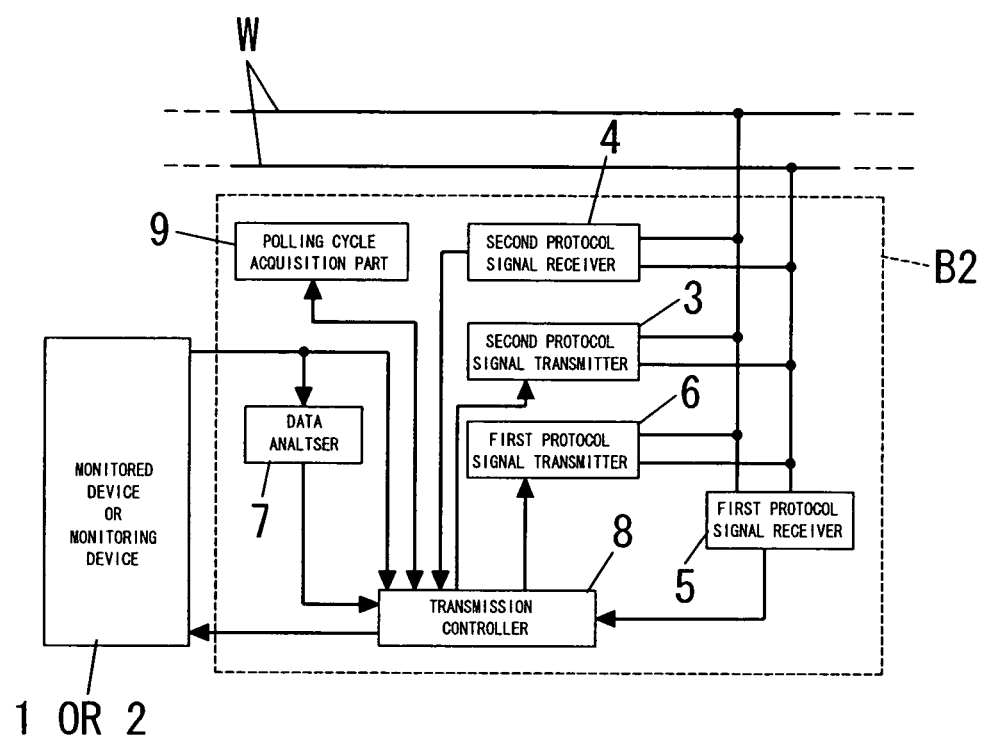
FIG. 10 is a schematic diagram of a communication system in accordance with a second embodiment of the present invention.

FIG. 10 shows essential parts of a communication system in accordance with a second embodiment of the present invention. The communication system is characterized by: each monitoring device (2) of second communication units (B22) periodically obtaining second monitoring information by periodic polling; and each data transmitter of first communication units (B21) transmitting control information except the timing of the polling.

The periodic polling is first explained. Under a second communication unit (B22), the monitoring device (2) performs periodic (sequential) polling with respect to one (or more) related first communication unit (B21) in accordance with the second protocol through the second communication unit (B22). Also, the monitoring device (2) periodically (sequentially) obtains second monitoring information returned from the one (or more) first communication unit (B21) in response to the periodic polling through the second communication unit (B22). In the first communication unit (B21), the data transmitter obtains second monitoring information from the monitored device (1) connected to the first communication unit (B21) in response to the periodic polling from the second communication unit (B22) and then periodically returns the second monitoring information to the second communication unit (B22).

Figure 11:
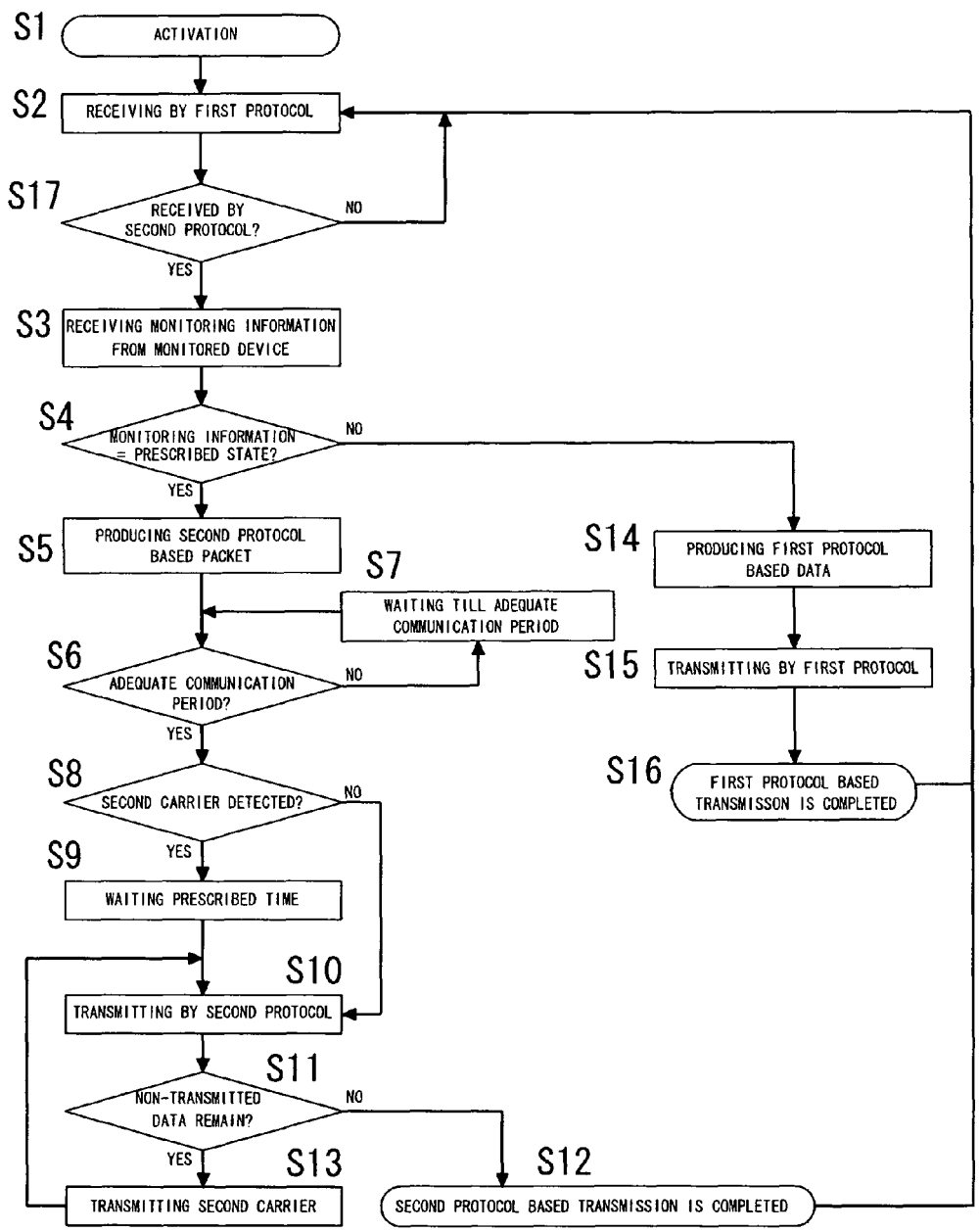
FIG. 11 is a flow diagram showing each operation of the communication units in the communication system.

In this instance, the (each) data analyzer (7) of the one (or more) first communication unit (B21) is configured to obtain second monitoring information by picking up the second monitoring information returned to the second communication unit (B22) from the monitored device (1) of the first communication unit (B21) in response to the periodic polling from the second communication unit (B22). That is, as shown in FIG. 11, the first communication unit (B21) receives a transmission signal in accordance with the first protocol until a packet according to the second protocol is received from the second communication unit (B22) (S2 and S17). When receiving the packet, the first communication unit (B21) judges that the packet is a polling from the monitoring device (2) and then obtains second monitoring information from the monitored device (1) (S3). Subsequent operations are performed as the same way as the first embodiment.

Transmission of control information from a first communication unit to a control terminal is explained. As shown in FIG. 10, the first communication unit (B21) further includes a polling cycle acquisition part (9) that is configured to obtain a polling cycle from the second communication unit (B22) through the second protocol signal receiver (4). The transmission controller (8) of the first communication unit (B21) is configured to transmit control information to at least one related control terminal (B12) through the communication control unit (A1) except the (start) timing of the obtained polling cycle when the data analyzer (7) judges that second monitoring information represents an unsteady state. In the second embodiment, second monitoring information is periodically returned. Accordingly, the polling cycle acquisition part (9) is also configured to obtain or previously hold time (return time) which it takes for the first communication unit (B21) to return second monitoring information to the second communication unit (B22) in response to polling from the second communication unit (B22). The transmission controller (8) is configured to transmit control information in accordance with the first protocol at a timing including the return time (e.g., at a point in time after the elapse of the return time from a start time point of the polling cycle)

Figure 12:
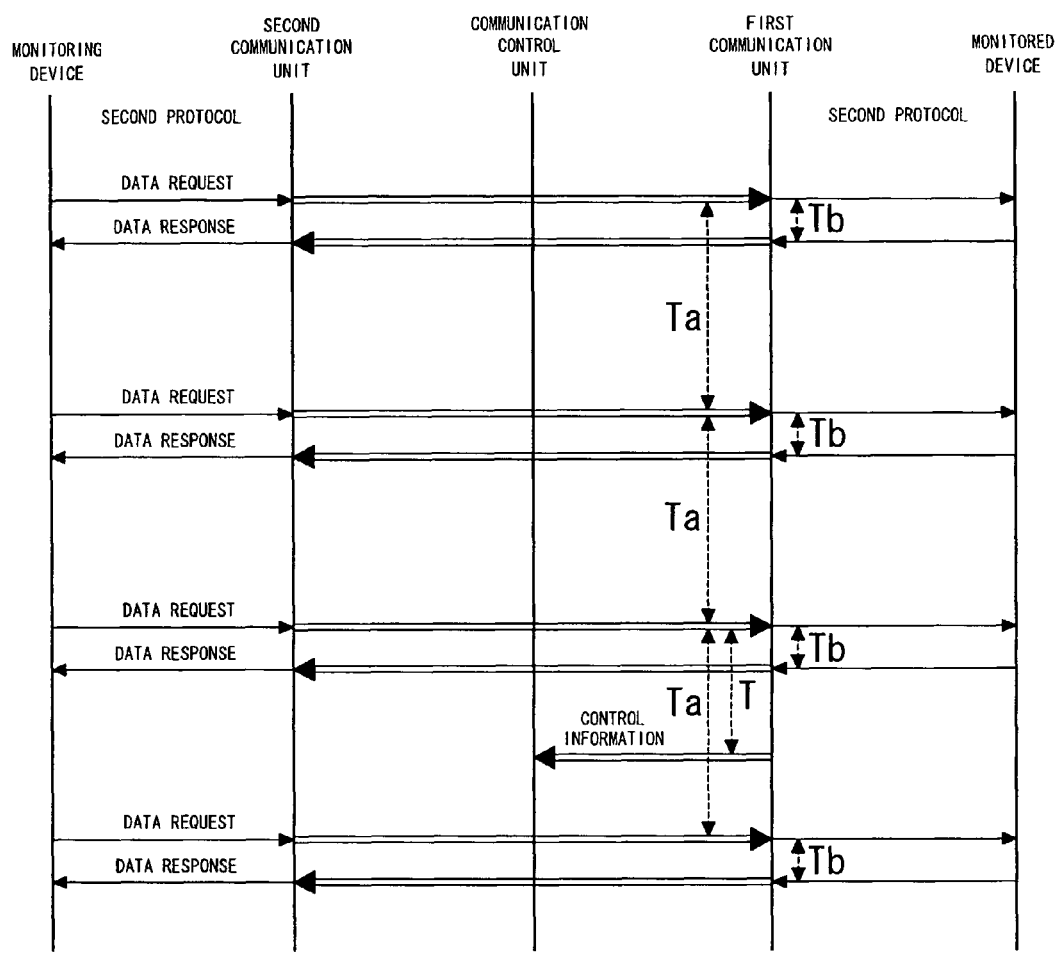
FIG. 12 is a diagram showing a sequence example of operation of the communication system.

Specifically, as shown in FIG. 12, in response to a "data request" from the monitoring device (2), the second communication unit (B22) performs polling with respect to the related first communication unit (B21) at a cycle "Ta". In response to this polling, the first communication unit (B21) obtains second monitoring information from the monitored device (1) to return the second monitoring information to the second communication unit (B22) at a point in time that time "Tb" elapses from the start time point of the cycle "Ta". This time "Tb" corresponds to the aforementioned return time. The polling cycle acquisition part (9) of the first communication unit (B21) can obtain the return time. If the data analyzer (7) of the first communication unit (B21) subsequently judges that the second monitoring information represents an unsteady state, the transmission controller (8) of the first communication unit (B21) transmits control information to the communication control unit (A1) in accordance with the first protocol at a timing including the return time "Tb". In the example of the FIG. 12, the control information is transmitted at a point in time immediately after time "T" elapses from the start time point of the cycle "Ta", where the time "T" is longer than the time "Tb" and shorter than the cycle "Ta". Thereby, the data (control information) transmitted in accordance with the first protocol can avoid being conflicted with the data (second monitoring information) transmitted in accordance with the second protocol. Accordingly, the generation of communication error can be reduced. Even if the polling cycle is short and a ratio of the return time "Tb" to the polling cycle "Ta" is comparatively large, conflict between control information and second monitoring information can be avoided.

In an embodiment, only second communication unit(s) (B22) to which a monitoring device (2) is connected is provided with a data analyzer (7). The data analyzer (7) is configured to judge whether or not the second monitoring information returned in response to polling from the first communication unit (B21) represents a steady state. If the second monitoring information represents a steady state, the data transmitter of the second communication unit(s) (B22) transmits control information corresponding to the second monitoring information to the control terminal (B12) related to the first communication unit (B21) through the communication control unit (A1) in accordance with the first protocol. In this embodiment, since each first communication unit (B21) has no data analyzer (7), cost of the communication system can be reduced.

Third Embodiment

Figure 13:
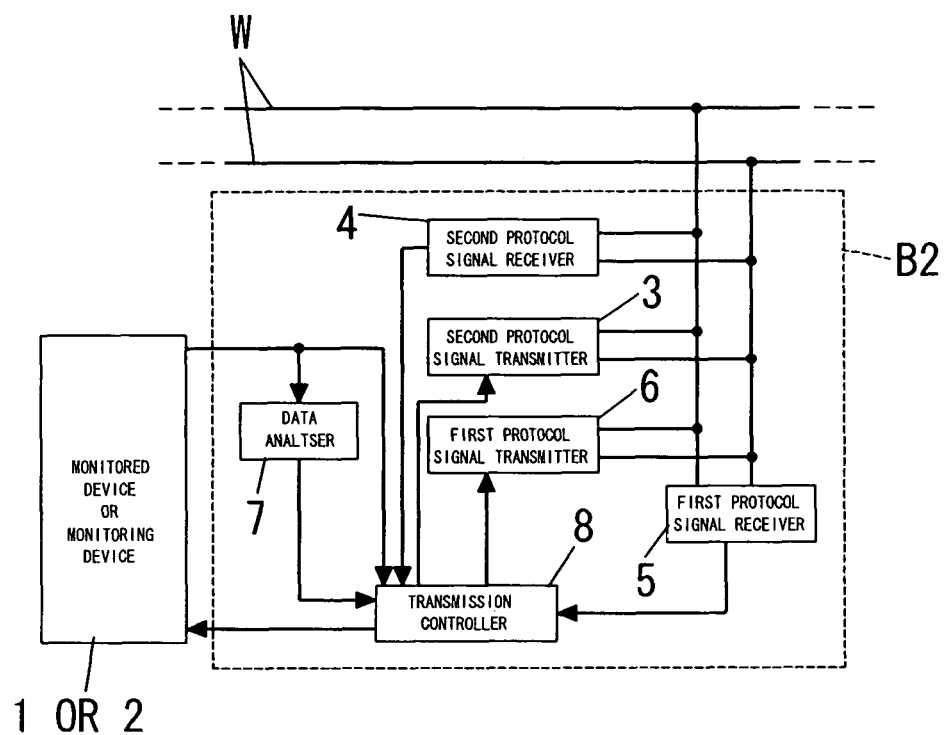
FIG. 13 is a schematic diagram of a communication system in accordance with a third embodiment of the present invention.

FIG. 13 shows essential parts of a communication system in accordance with a third embodiment of the present invention. The communication system differs from the first embodiment in that each communication unit (B2) further includes a switch part 10 and its own transmission controller (8) controls the switch part 10.

That is, each switch part 10 is configured to alternatively connect first or second protocol signal transmitter (6) or (3) of its own communication unit (B2) to the communication line (W). In the example of FIG. 13, the switch part 10 is formed of two switches. The data transmitter (transmission controller (8)) of the communication unit (B2) is configured, when performing communication in accordance with first or second protocol, to alternatively connect first or second protocol signal transmitter (6) or (3) to the communication line (W) through the switch part 10, respectively.

Figure 14:
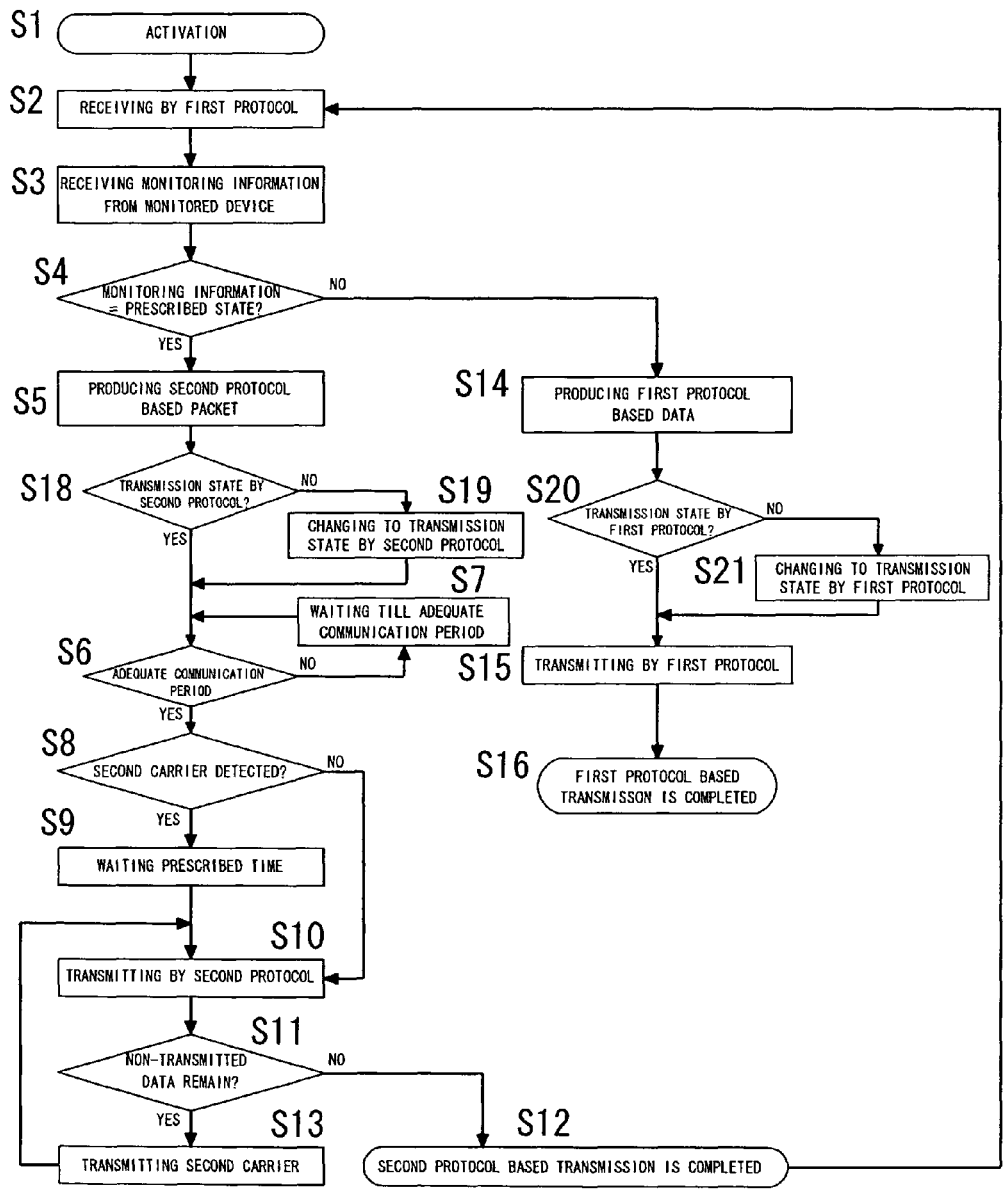
FIG. 14 is a flow diagram showing each operation of the communication units in the communication system.

As shown in FIG. 14, in a first communication unit (B21), if it is judged that second monitoring information represents a steady state (S4), the transmission controller (8) of the first communication unit (B21) produces a packet including the second monitoring information in accordance with the second protocol (S5). The transmission controller (8) subsequently judges whether or not the second protocol signal transmitter (3) is connected to the communication line (W) (S18). If the second protocol signal transmitter (3) is connected to the communication line (W), the step S6 is proceeded to. Otherwise, the transmission controller (8) connects the second protocol signal transmitter (3) to the communication line (W) through the switch part 10 and the step S6 is proceeded to. Subsequent operations are performed as the same way as the first embodiment.

In the aforementioned first communication unit (B21), if it is judged that the second monitoring information represents an unsteady state (S4), the transmission controller (8) of the first communication unit (B21) produces data (control information) in accordance with the first protocol (S14). The transmission controller (8) subsequently judges whether or not the first protocol signal transmitter (6) is connected to the communication line (W) (S20). If the first protocol signal transmitter (6) is connected to the communication line (W), the step S15 is proceeded to. Otherwise, the transmission controller (8) connects the first protocol signal transmitter (6) to the communication line (W) through the switch part 10 and the step S15 is proceeded to. Subsequent operations are performed as the same way as the first embodiment.

In the communication according to the first protocol, a voltage signal (transmission signal) is sent out from the communication control unit (A1) and an electric current mode signal is sent out from any of the communication terminal units (B1) as need arises. In the communication according to the second protocol, a voltage signal is superimposed on the aforementioned transmission signal. Accordingly, the communication according to the second protocol requires comparatively high impedance. In the third embodiment, first or second protocol signal transmitter (6) or (3) of each communication unit (B2) is alternatively connected to the communication line (W) and both of the first and second protocol signal transmitters are not connected to the communication line (W). Accordingly, it is possible to enhance impedance of a communication unit (B2) seen from the communication line (W) in comparison with the connection of both of the first and second protocol signal transmitters to the communication line (W).

Although the present invention has been described with reference to certain preferred embodiments, numerous modifications and variations can be made by those skilled in the art without departing from the true spirit and scope of this invention, namely claims.

The invention claimed is:

1. A communication system, comprising:
a communication control unit connected to a communication line;
communication terminal units which are connected to a communication line and configured to communicate with the communication control unit in accordance with a first protocol; and
communication units which are connected to the communication line and configured to mutually communicate in accordance with a second protocol,
wherein the communication terminal units comprise at least one first communication terminal unit and at least one second communication terminal unit which are related previously, wherein by transmitting control information corresponding to first monitoring information to at least one related second communication terminal unit, the first communication terminal unit controls a load connected to the second communication terminal unit,
wherein the communication units comprise at least one first communication unit and at least one second communication unit which are related previously, wherein if obtaining second monitoring information, the first communication unit transmits the second monitoring information to a related second communication unit,
wherein a specific communication unit of the communication units comprises:
a data analyzer configured to judge whether or not obtained second monitoring information represents a steady state; and
a data transmitter configured, if the second monitoring information represents an unsteady state, to transmit control information corresponding to the second monitoring information to at least one related second communication terminal unit in accordance with the first protocol and thereby to control the load connected to the second communication terminal unit,
wherein said first communication unit is said specific communication unit and connected with a monitored device configured to produce said second monitoring information,
wherein said second communication unit is connected with a monitoring device configured to obtain second information from at least one related first communication unit,
wherein the data analyzer of said first communication unit is configured, when the monitored device connected to the first communication unit communicates with a monitoring device connected to a related second communication unit, to obtain second monitoring information transmitted from the monitored device to the monitoring device,
wherein the monitoring device connected to said second communication unit is configured to perform periodic polling with respect to at least one related first communication unit in accordance with the second protocol through the second communication unit and to periodically obtain second monitoring information returned from the first communication unit in response to the periodic polling through the second communication unit, wherein said first communication unit further comprises a polling cycle acquisition part configured to obtain a cycle of the periodic polling, wherein the data transmitter of said first communication unit is configured, if judgment result of an unsteady state is obtained from the data analyzer of the first communication unit, to transmit said control information to at least one related second communication terminal unit through the communication control unit except the timing of the cycle of the periodic polling.

2. The communication system of claim 1, wherein the polling cycle acquisition part of said first communication unit is configured to obtain return time which it takes for the first communication unit to return second monitoring information to said second communication unit in response to polling from the second communication unit, wherein the data transmitter of said first communication unit is configured to transmit said control information to at least one related second communication terminal unit except the timing of the cycle of the periodic polling and the return time.

3. The communication system of claim 1, wherein only second communication unit connected with said monitoring device is provided with said data analyzer.

4. The communication system of claim 1, wherein said data transmitter comprises:

a first protocol signal transmitter configured to transmit data in accordance with the first protocol;

a second protocol signal transmitter configured to transmit data in accordance with the second protocol; and a switch part configured to alternatively connect said first or second protocol signal transmitter to the communication line.

5. The communication system of claim 1, wherein said first communication unit further comprises a storage device which stores control information corresponding to the second monitoring information, wherein the data analyzer of said first communication unit is connected with the monitored device of the first communication unit side, wherein the data transmitter of said first communication unit is configured to read control information, corresponding to second monitoring information from the monitored device, from the storage device to transmit the control information to at least one related second communication terminal unit.

6. The communication system of claim 1, wherein said specific communication unit further comprises a threshold setting part that is configured to set a criterion threshold by which said data analyzer judges whether or not said second monitoring information represents a steady state.

\* \* \* \* \*